(12) United States Patent
Nolting et al.

(10) Patent No.: US 6,505,807 B1
(45) Date of Patent: Jan. 14, 2003

(54) BLOWER MOTOR WITH ANNULAR DAMPING ELEMENT

(75) Inventors: Peter Nolting, Buehlertal (DE); Wolfgang Kehrer, Freiburg (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 09/937,168

(22) PCT Filed: Jan. 16, 2001

(86) PCT No.: PCT/DE01/00159

§ 371 (c)(1),
(2), (4) Date: Jan. 8, 2002

(87) PCT Pub. No.: WO01/54252

PCT Pub. Date: Jul. 26, 2001

(30) Foreign Application Priority Data

Jan. 20, 2000 (DE) .......................................... 100 02 231

(51) Int. Cl.[7] ................................................. F16M 1/00
(52) U.S. Cl. ........................................ 248/638; 310/251
(58) Field of Search ........................... 310/251; 248/638, 248/674, 634; 416/244 R

(56) References Cited

U.S. PATENT DOCUMENTS

| 2,352,591 | A |   | 6/1944 | Wallerstein, Jr. |
| 3,601,502 | A |   | 8/1971 | Harter |
| 5,112,024 | A | * | 5/1992 | Stanko ........................ 248/638 |
| 6,107,706 | A | * | 8/2000 | Neckermann et al. ........ 310/51 |
| 6,278,209 | B1 | * | 8/2001 | Rupp et al. .................... 310/51 |

FOREIGN PATENT DOCUMENTS

| DE | 199 06 585 A | 8/1999 |
| FR | 2 761 120 A | 9/1998 |
| GB | 2 030 377 A | 4/1980 |
| WO | 99 03608 A | 1/1999 |

* cited by examiner

Primary Examiner—Ramon O. Ramirez
(74) Attorney, Agent, or Firm—Michael j. Striker

(57) ABSTRACT

A blower motor (10) is accommodated in a housing pot (12) with a fastening flange (14); damping elements are disposed between the blower motor (10) and a fastening region (16). At least one annular dampling element (24, 54, 56, 90) is disposed between the housing pot (12) and a fastening region (16) of the fastening flange (14).

22 Claims, 11 Drawing Sheets

BLOWER MOTOR WITH ANNULAR DAMPING ELEMENT

BACKGROUND OF INVENTION

The invention is based on a blower motor as defined generically by the preamble to claim 1.

Blower motors for motor vehicle heating systems are as a rule accommodated in a housing pot, which is fastened by its fastening flange to an opening in the heating system and tightly closes off the opening. To prevent vibration and structure-borne sound from being transmitted to body parts and causing noise, damping elements are disposed between the blower motor and the fastening points. The damping elements for instance comprise rubber-elastic damping and sealing rings, which are disposed in the fastening region of the fastening flange and/or between the blower motor and the housing pot and seal off the heating conduit.

Individual damping elements can also be located on the bottom of the housing pot and secured to the housing pot, protruding with their face end into the interior of the housing pot and forming axial bearing points for the blower motor. First, the individual damping elements are mounted, and then the blower motor is inserted into the housing pot. Because of the strong frictional forces between the blower motor and the damping elements, blower motors can be mounted only with difficulty. The fastening flange formed onto the housing pot is furthermore adapted to each vehicle type and to a specific application, so that every geometric variant in fastening the heating system requires a complete new flange and housing pot part. The wide variety of parts also makes stockkeeping and logistics difficult.

Another bearing comprises premounting an adaptor on the blower motor, with the adaptor receiving damping elements distributed over the circumference. The damping elements secure the location of the blower motor both axially and radially. Although by means of the adaptor various blower motors can be assigned to one housing pot, nevertheless this is feasible only for the additional adaptor, which further increases the number of parts and makes assembly and production more complicated and expensive.

The blower motor can also be mounted on the heating system by means of a fastening frame. This frame has three struts distributed over its circumference, whose ends have fastening eyelets with rubber elastic parts. The combination of mechanical fastening and decoupling, however, limits the choice of optimal physical properties of the damping elements, because these elements must have not only good damping properties but also adequate strength. The resultant compromises in terms of internal friction, Shore hardness, relaxation and temperature resistance accordingly do not always lead to adequate decoupling. Since furthermore there is a general need to avoid the escape of leaking air in the region of the blower motor, when a blower motor is mounted in the above-described fastening frame, an additional cover on the back side of the blower motor is necessary as well.

SUMMARY OF THE INVENTION

According to the invention, at least one annular damping element is disposed between a housing pot and a fastening region of a fastening flange. This damping element can be designed exclusively in view of damping needs and can have an adequate volume, without structurally affecting the relationship of the blower motor to the housing pot or increasing the structural volume of the housing pot. Moreover, because of the annular design of the damping element, the sealing off of the mounting opening of the housing pot is preserved. For sealing off the fastening flange directly at the fastening region as well as for sealing off a gap between the blower motor and the housing pot, small-volume sealing means in the form of sealing rings or sealing coatings suffice. The blower motor is fastened in a simple way, mechanically directly, in the housing pot, as a result of which on the one hand fewer components are needed, while on the other hand, assembly is simplified.

In order to meet various demands made of the damping, it is expedient that the damping element comprises various parts whose materials have different physical properties. As a result, in particular, different damping properties in the radial direction and in the circumferential direction can be attained.

In one feature of the invention, it is provided that the housing pot has a travel limitation in the circumferential direction and/or in the radial and/or axial direction relative to the fastening region. Especially if there is a soft, subcritical adaptation of the damping elements, this prevents them from being overloaded in the event of load surges, such as when the blower motor is turned on or when shocks occur, and prevents the blower motor from executing excessively long motions and striking adjacent parts. The travel limitation can be embodied in a simple way by oblong slots on the fastening flange, which are engaged by extensions of the housing pot on the face that are embedded in damping elements. After a predetermined damping travel, the extensions are blocked by the contours of the oblong slots.

The fastening flange expediently comprises an inner and an outer part. The parts are joined to one another via the annular damping element. The inner part of the fastening flange can be formed onto the housing pot or secured either nondetachably or detachably, while the outer part has the fastening region on its outer edge. The connection between the outer part and the inner part can be designed in various ways and adapted to installation conditions. Expediently, the outer part overlaps the inner part, and the damping element is disposed in the region of the overlap. The damping element can be joined to the parts by vulcanizing, gluing, or an injection molding process, especially a two-component injection molding process. It is also possible to fix the damping element between the outer and inner parts by mechanical fastening means, such as rivets or screws, using shims; the fastening elements are decoupled from the parts of the fastening flange by further damping elements.

For the durability of the damping elements, it is most favorable if they are under thrust or pressure. Thus in one feature of the invention, in a horizontal installation of the blower motor, the fastening flange is embodied in such a way and the annular damping element is disposed in such a way that it is under pressure. For a targeted soft adaptation of the damping element, in individual applications, it may also be expedient, however, for the damping element to be under tension.

To obtain a one-piece fastening flange, it is expedient to dispose the damping element between the housing pot and the fastening flange. The damping element can be joined to one or both parts solidly or detachably. The detachable connection has the advantage that various fastening flanges can be combined with one housing pot, so that with only a few parts a wide variety of variants can be offered. One simple design is obtained if the damping element surrounds the housing pot and is gripped by a collar formed onto the fastening flange. The axial length of the collar brings about good bracing of the blower motor and can be adapted to the tilting moments and thrust forces exerted by the blower motor.

To secure the blower motor axially in the housing pot, it can be expedient to provide a cap, which is braced on the face end via a further damping element on the motor and/or the housing pot and is clipped to axial protrusions of the fastening flange. The axial protrusions expediently rest on a shoe-shaped receptacle for the annular damping element, which contacts the circumference of the housing pot.

In a further feature of the invention, a ventilation conduit is provided, which is connected to the outer part of the fastening flange and is decoupled from the housing pot by an additional annular damping element. Because of the good air circulation, the blower motor is adequately cooled and is protected against overheating.

To enable better mounting of the blower motor, it is advantageous to divide the housing pot along a longitudinal or transverse plane. If it is divided along a transverse plane, the flange in the annular damping element are disposed in the region of the parting plane, and the damping element can advantageously be glued to the housing pot or otherwise joined to it on the outer circumference on both sides of the parting seam. If the division is along a longitudinal plane, the damping element and the flange press the two parts together at the parting faces.

Further advantages will become apparent from the ensuing drawing description. In the drawing, exemplary embodiments of the invention are shown. The drawing, description and claims include numerous characteristics in combination. One skilled in the art will expediently consider the characteristics individually as well and put them together to make appropriate further combination.

BRIEF DESCRIPTION OF THE DRAWINGS

Shown are.

DETAILED DESCRIPTION OF THE PREFERRED EMBODIMENTS

Figure 1:
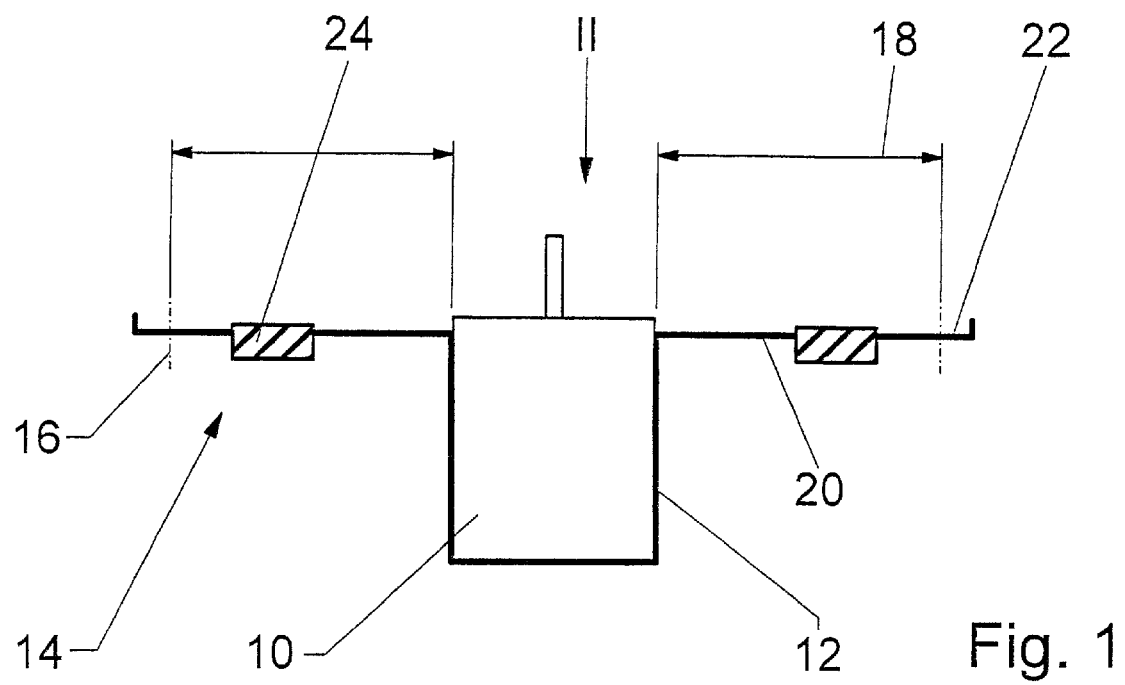
FIG. 1, a schematic longitudinal section through a housing pot with at least one annular damping element in the region of a fastening flange.
Figure 2:
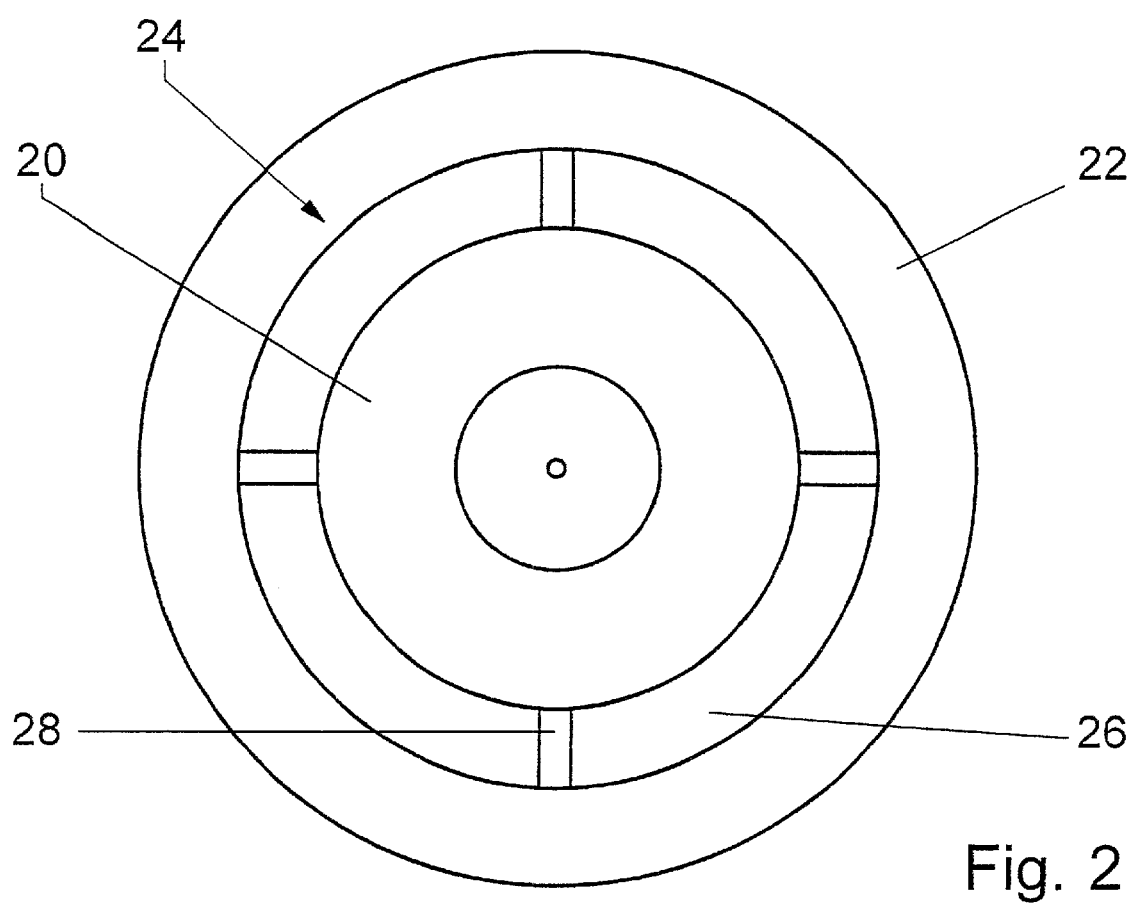
FIG. 2, a plan view in the direction of the arrow II in FIG. 1.

A blower motor 10 is accommodated in a housing pot 12, which is connected to a heating system, not shown here, via a fastening flange 14. The blower motor 10 drives a fan wheel 76 with a fan hub 78 and with radial blades. In the versions of FIGS. 1–5, the fastening flange 14 comprises an inner part and an outer part 22, which are joined together by at least one annular damping element 24. The damping element 24 can comprise a plurality of annular or annularly joined-together parts 26, 28, which have different physical properties. What the parts 26, 28 are made up of, and their physical properties, are chosen to suit the particular demands made in a given installation. For instance, the elasticity and load-bearing capacity in the radial, axial and/or circumferential direction can be adapted to the installation situation. (FIG. 2)

Because of the annular shape of the damping element 24, on the one hand good damping properties are attained, and on the other the parts 20 and 22 are joined tightly together, so that no air can escape out of the heating system through the damping region. The outer part 22 of the fastening flange 14 has a fastening region 16, which has a radial spacing 18 from the blower motor 10.

Figure 3:
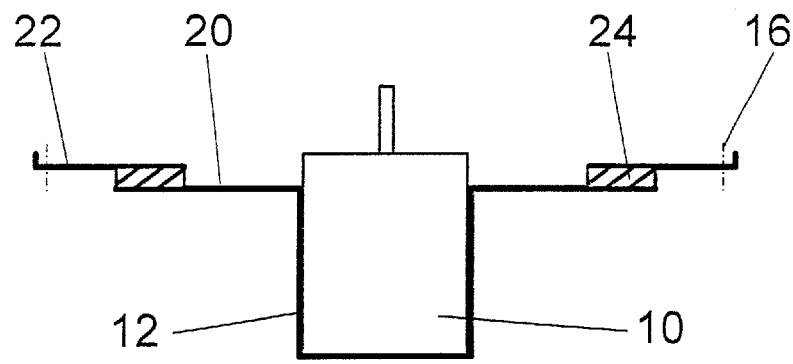
FIGS. 3–5, variants of FIG. 1.
Figure 4:
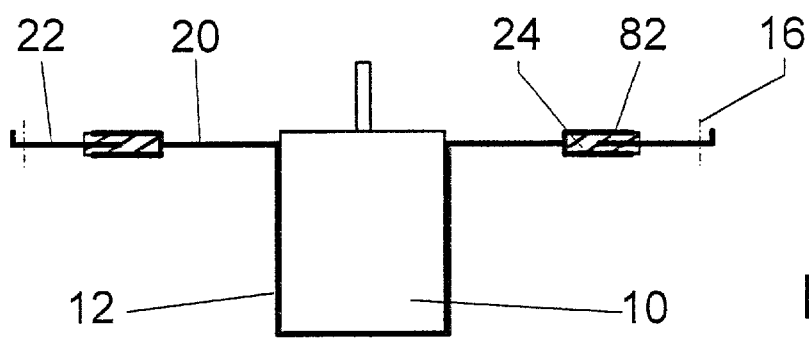

FIG. 3 shows a housing pot 12; the outer part 22 of the fastening flange 14 partly overlaps the inner part 20 in the region between the housing pot 12 and the fastening region 16 of the fastening flange 14. In the region of overlap, the annular damping element 24 connects the parts 20, 22, being sprayed, glued or vulcanized onto them. A further design of the connecting point is also shown in FIG. 4, where the inner part 20 is embodied on its circumference as a shoe 82. The shoe is filled with the damping element 24, for instance by spraying the damping element into the shoe, and the outer part is embedded in this damping element from the open side.

Figure 5:
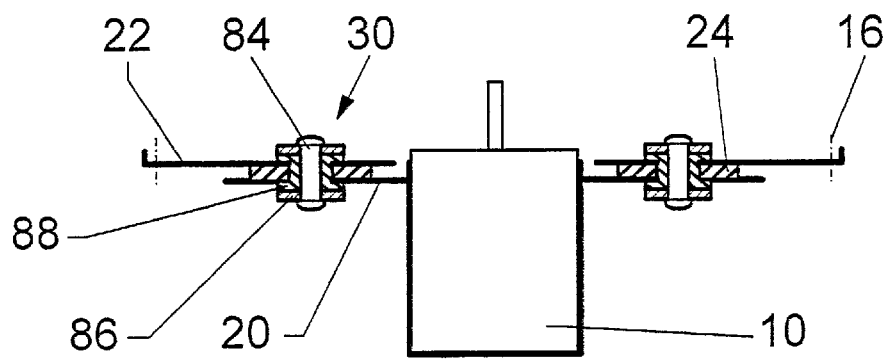

FIG. 5 shows a further design, in which the outer part 22 overlaps the inner part 20. The damping element 24 is disposed as a separate component between the inner part 20 and the outer part 22. At a plurality of fastening points 30 distributed over the circumference, mechanical fastening means in the form of rivets 84 or screws in conjunction with disks 86 hold the parts 20, 22 together. A further damping element 88 decouples the fastening parts 84, 86 from the parts 20, 22 of the fastening flange 14. Before the parts 20, 22 are joined together, the fastening flange 14 can be adapted to given installation conditions by means of a suitably selected outer part 22.

Figure 9:
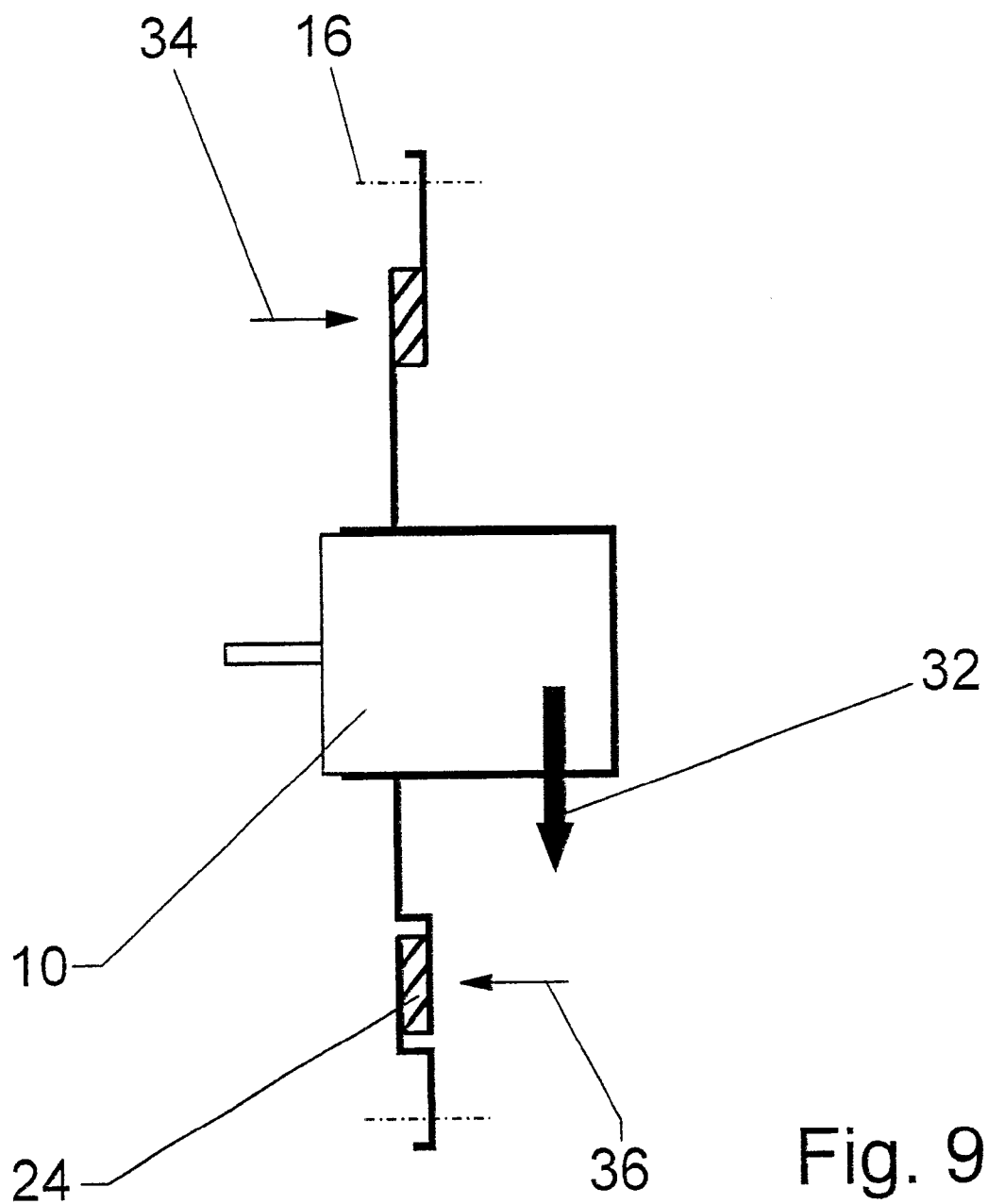
FIG. 9, a schematic longitudinal section through a horizontally disposed housing pot.

The blower motor 10 and the housing pot 12 can be installed vertically, horizontally or obliquely, as needed. In FIG. 9, a horizontal installed position is shown, which the damping element 24 is advantageously disposed such that the tilting moment of the damping element 24, caused by gravity 32, is under pressure both in the upper and the lower region in the direction of the arrows 34 and 36. This can be attained in that the outer part 22 is split, and the lower or upper region of the parts 20, 22 is correspondingly bent.

Figure 6:
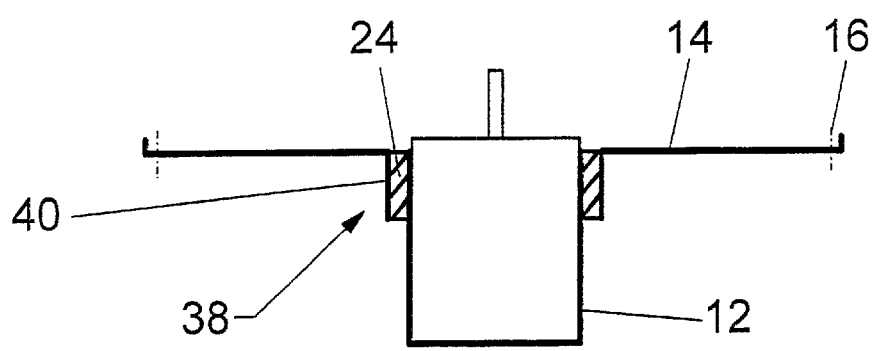
FIG. 6, a schematic longitudinal section through a housing pot with a damping element in the transitional region to the fastening flange.

In the version of FIG. 6, the annular damping element 24 is disposed in the transitional region 38 of the housing pot 12, toward the fastening flange 14. As a result, the fastening flange 14 can be made in one piece, and the housing pot 12 is given a simple outer contour. Expediently, the fastening flange 14, on its side toward the housing pot 12, has a formed-on collar 40, which surrounds the damping element 24 and braces the blower motor 10 well against tilting moments. The damping element 24 can be solidly joined in a suitable way to the fastening flange 14 and its collar 40 and/or to the housing pot 12. A detachable connection has the advantage that the fastening flange 14 can be modified to adapt to installation conditions, while for numerous applications the housing pot 12 and the blower motor 10 remain the same.

Figure 7:
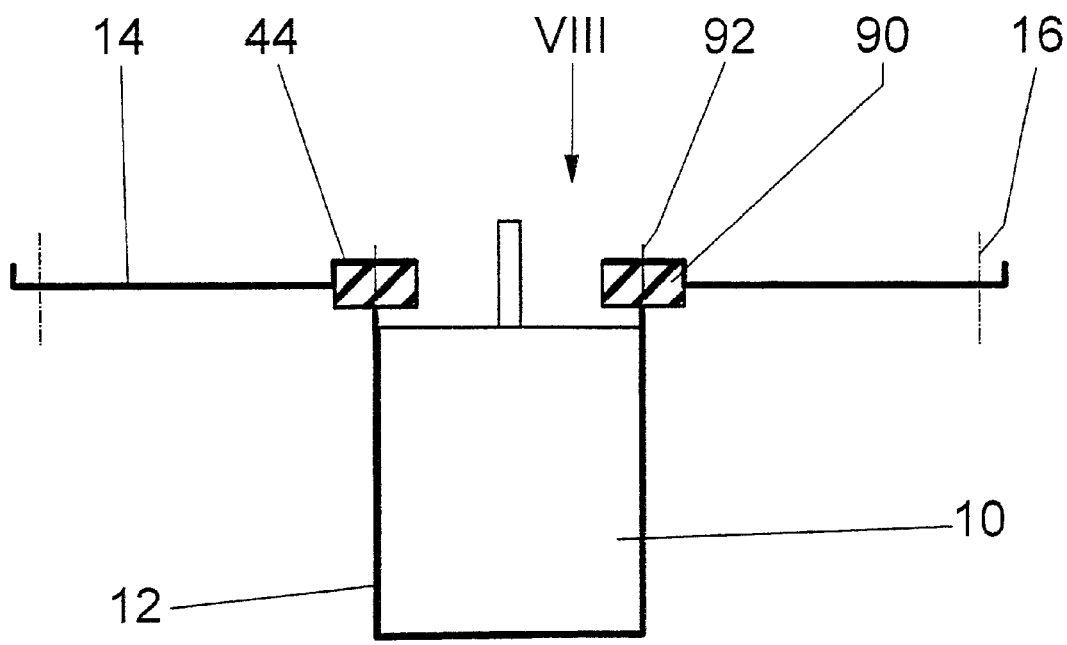
FIG. 7, a variant of FIG. 6.
Figure 8:
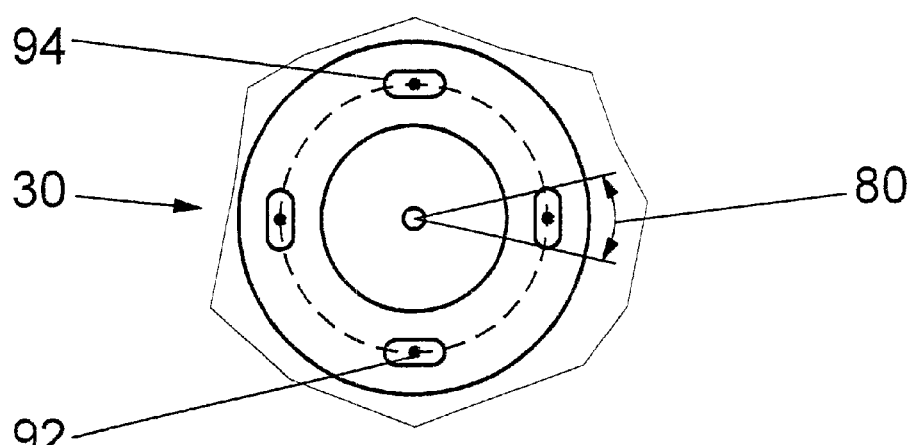
FIG. 8, a plan view in the direction of the arrow VIII in FIG. 7, in detail.

FIG. 7 shows an embodiment with a fastening flange 14 mounted on the face end on the housing pot 12. To that end, the flange, on its inside diameter, has a formed-on collet 44, which fixes the damping element 90, disposed between the housing pot 12 and the fastening flange 14, both axially and radially. Expediently, the fastening flange 14 is mechanically secured to the face end of the housing pot 12, being seated on face-end extensions 92 of the housing pot 12 that are distributed over the circumference and are embedded in the damping element 90. They protrude through oblong slots 94 of the fastening flange 14, which limit the maximum motion of the housing pot 12 relative to the fastening flange 14. The possible rotational travel is indicated by reference numeral 80. (FIG. 8)

Figure 10:
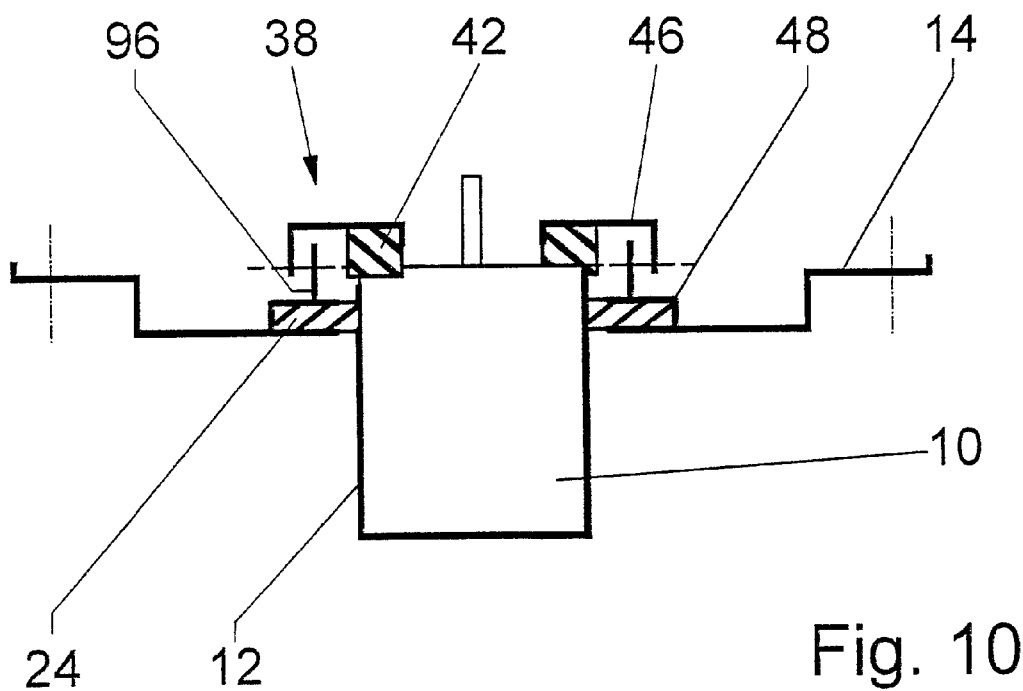
FIGS. 10, 11, variants of FIG. 6.

FIG. 10 shows an arrangement in which the damping element 24 is accommodated in the transitional region 38, in a shoe-shaped receptacle 48 on the inside diameter of the fastening flange 14, the receptacle being open toward the housing pot 12. On its face end, the receptacle 48 has protrusions 96, onto which a cap 46 is clipped, the cap being braced via a further damping element 42 on the face end of the blower motor 10 and/or of the housing pot 12. The damping element 24 can fix the blower motor 10 in the axial direction and can seal off the gap between the blower motor and the housing pot 12.

Figure 11:
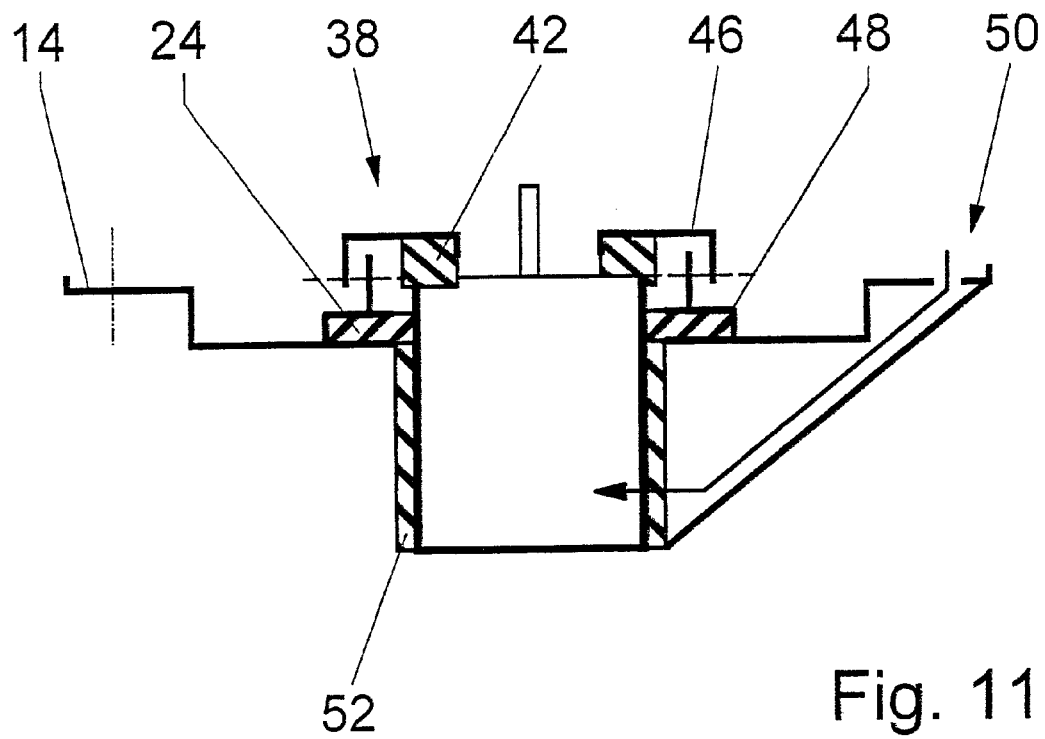
Figure 17:
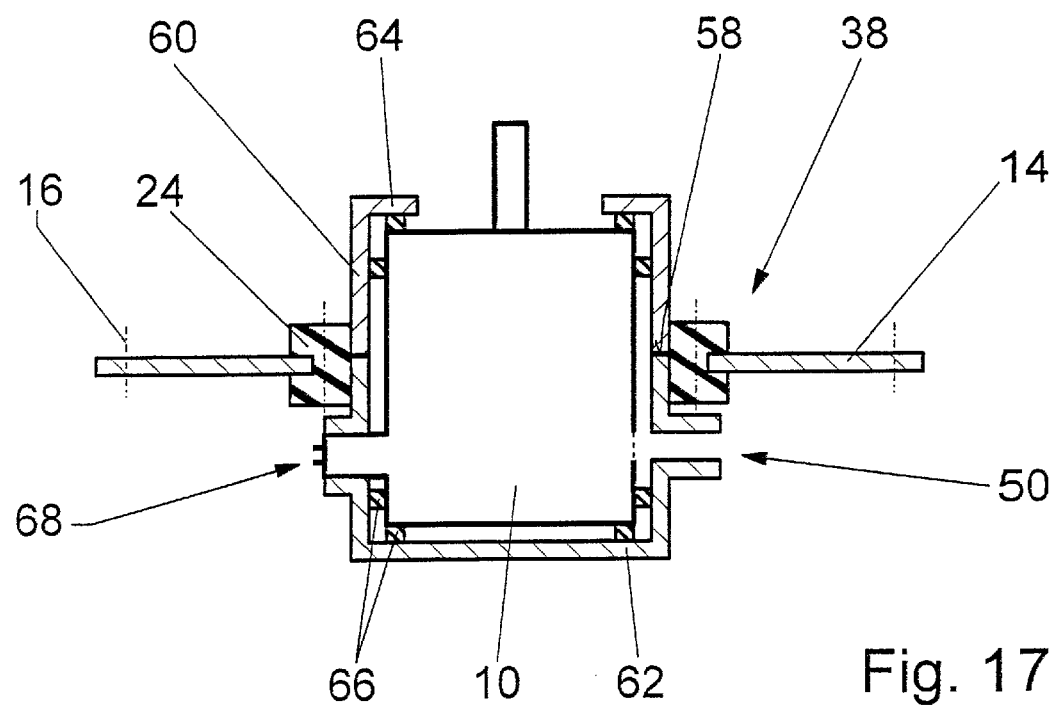

In the event of excessive heating, the blower motor 10 must be supplied with cooling air. One variant shown in FIG. 11 has a ventilation conduit 50, which is decoupled from the housing pot 12 via a further damping element 52. A similar ventilation conduit is shown in the version of FIG. 17, for a housing pot 12 that is split transversely. To improve the decoupling between the housing pot 12 and the blower motor 10 and for the sake of targeted ventilation of the interior of the housing pot 12 for the sake of motor cooling, further damping elements 66 in the form of sealing rings are provided between the blower motor 10 and the housing pot 12 and brace the blower motor 10 axially and radially.

Figure 12:
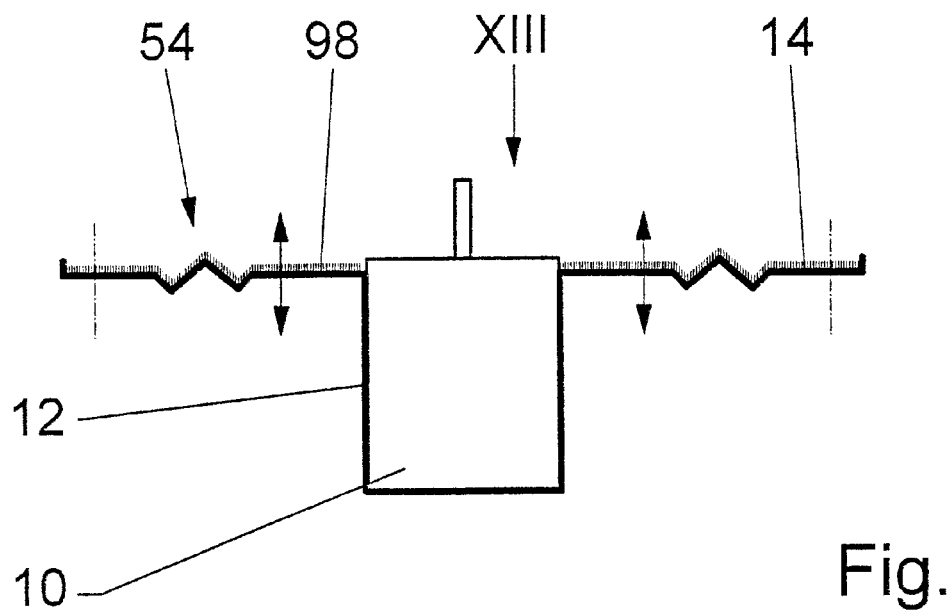
FIG. 12, a shematic longitudinal section through the fastening flange of a housing pot with an elastic zone.
Figure 13:
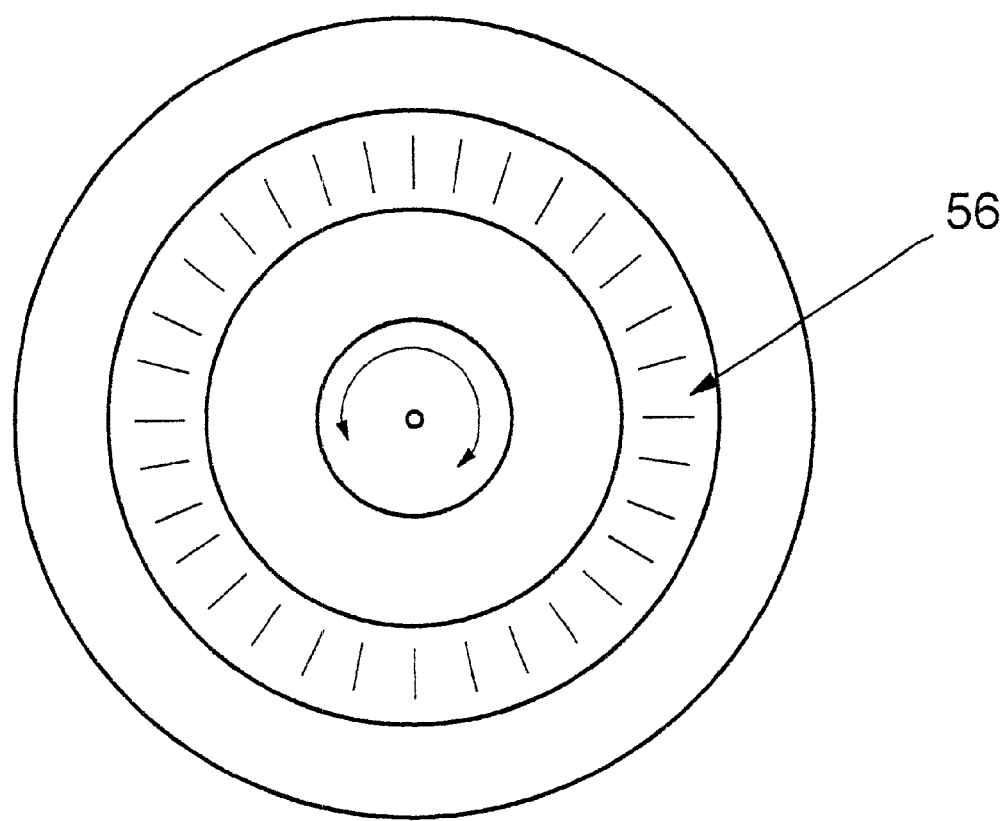
FIG. 13, a variant of FIG. 11 in a plan view in the direction of an arrow XIII in FIG. 12.
Figure 14:
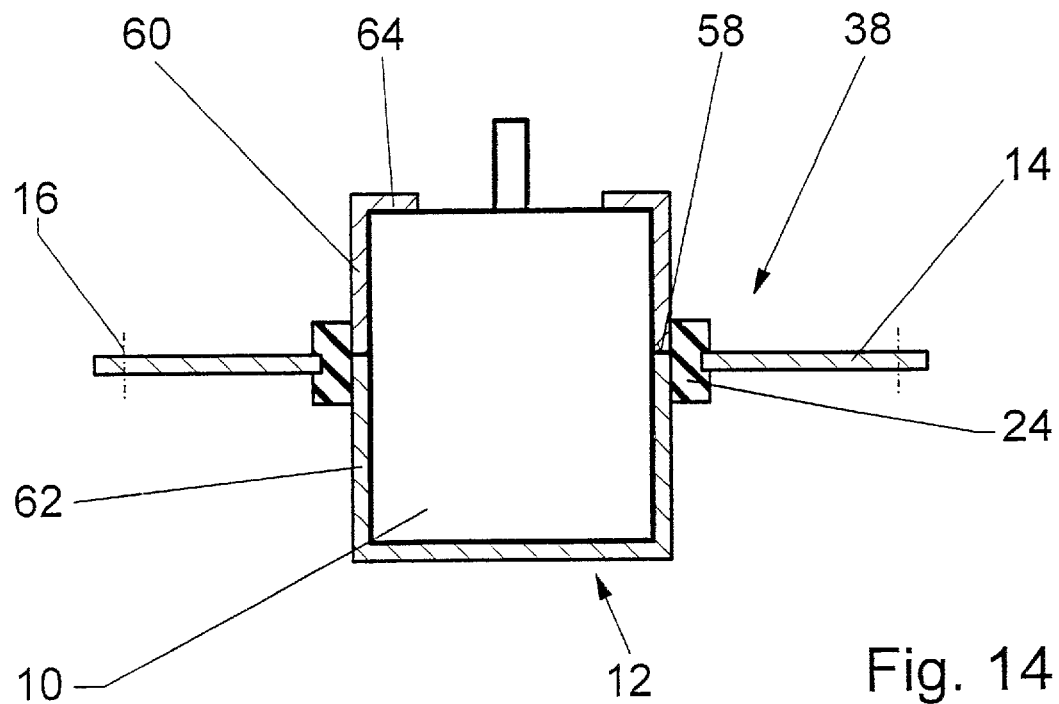
FIG. 14, a schematic longitudinal section through a housing pot with a parting plane that is transverse to the axial direction the blower motor.

FIG. 12 shows a further variant of a fastening flange 14, which itself is embodied in one region as a damping element 54, as a result of this region being corrugated or folded in the radial direction and thus being more yielding to loads in the radial and axial direction. To achieve resilience in the circumferential direction, the region of the fastening flange 14 is corrugated or folded as a damping element 56 in the circumferential direction (FIG. 13), and the corrugations of the elastically yielding region extend in radiating fashion outward. The resilience can be varied in this region by the geometrical design and the thickness of the material. The noise-damping properties can also be further improved by applying a layer 98 of damping material to the face end, or both ends, of the fastening flange 14.

Figure 15:
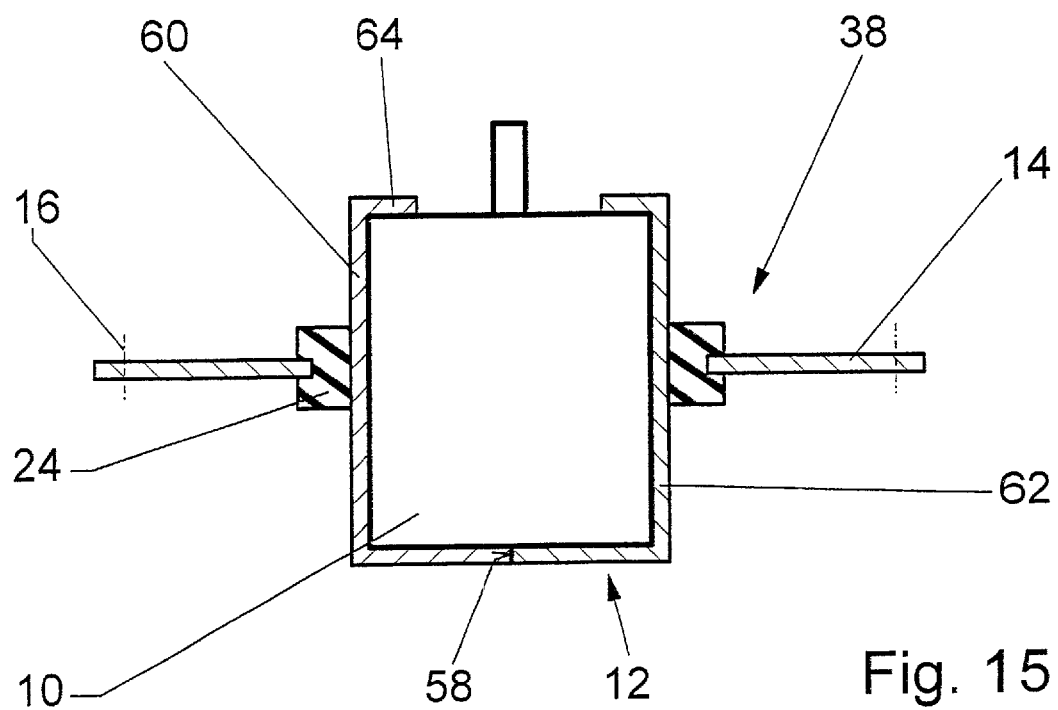
FIG. 15, a schematic longitudinal section through a housing pot with a parting plane in the axial direction of the blower motor.
Figure 16:
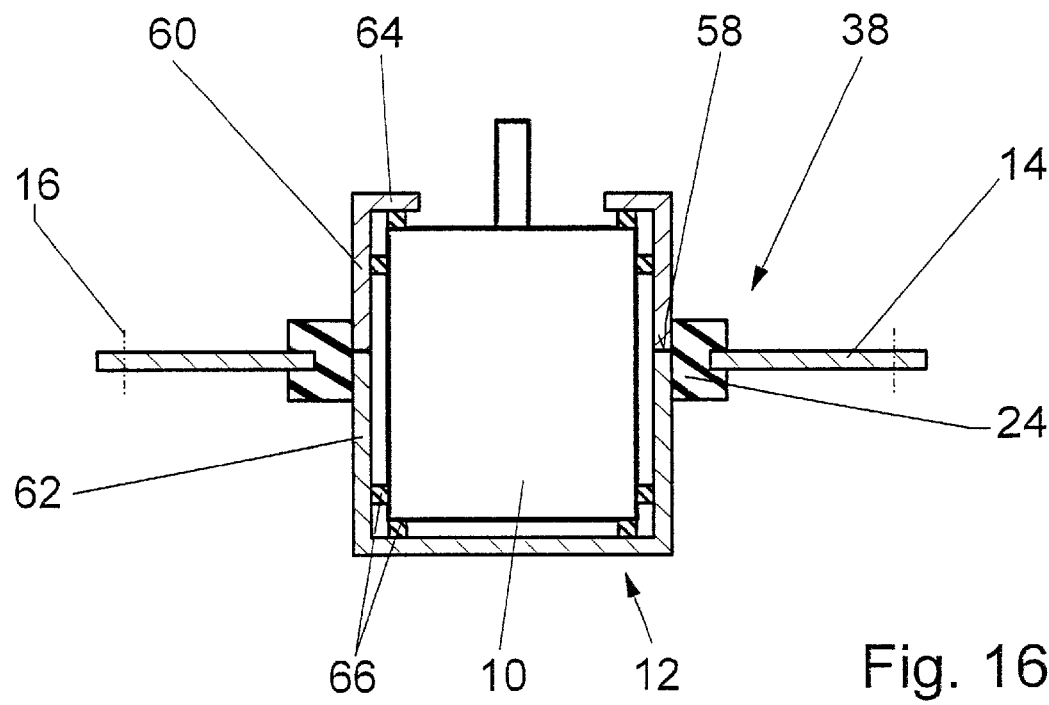
FIGS. 16–22, variants of FIG. 14.

The versions of FIGS. 14–21 have a split housing pot 12; while the housing pot 12 of FIG. 15 is split in a parting plane 58 extending in the axial direction of the blower motor 10, the housing pots 12 of FIGS. 14, 15–22 are split in a parting plane 58 that extends transversely to the axial direction of the blower motor 10. The housing parts of the housing pot 12 are designated by reference numerals 60 and 62. The blower motor 10 is axially fixed between the housing bottom of the housing pot 12 and a collet 64, provided on the opposite face end.

In the versions in which the housing pot 12 is split in a transverse plane, the annular damping element 24 and the fastening flange 14 are disposed in the region of the parting plane 58. The damping element 24 can be secured to the parts 60 or 62 of the housing pot 12 and/or to the fastening flange 14 by pressure, by adhesive bonding, by vulcanization, or by an injection molding process, preferably a two-component injection molding process. The damping element 24 can also be fixed to the fastening flange via mechanical connecting means, in the form of screws or rivets in conjunction with disks, similarly to the version of FIG. 5.

In the versions of FIGS. 16–22, further damping elements 66 are disposed between the blower motor 10 and the housing pot 12, and the blower motor 10 is braced axially and radially on these damping elements. The interior of the housing pot 12 is ventilated in a targeted way via a ventilation conduit 50, so that the blower motor 10 is adequately cooled. The ventilation conduit 50 and an electrical terminal 68 for the blower motor 10 are expediently disposed on the same housing pot part 62, so that the other housing pot part 60 can be embodied identically in all the versions.

Figure 18:
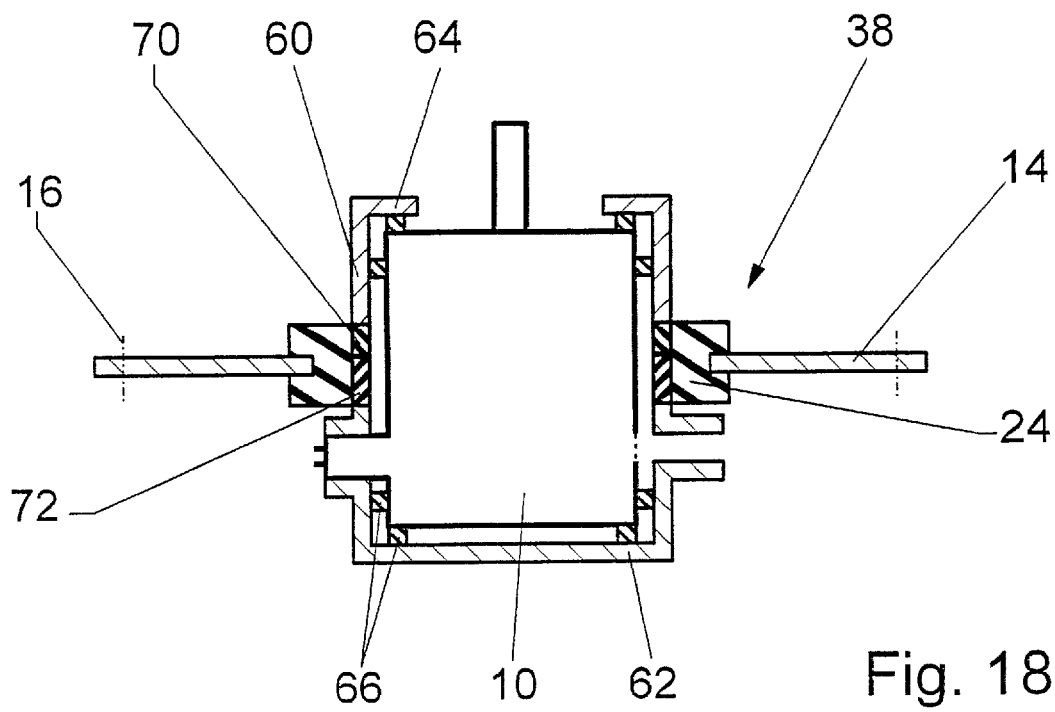
Figure 19:
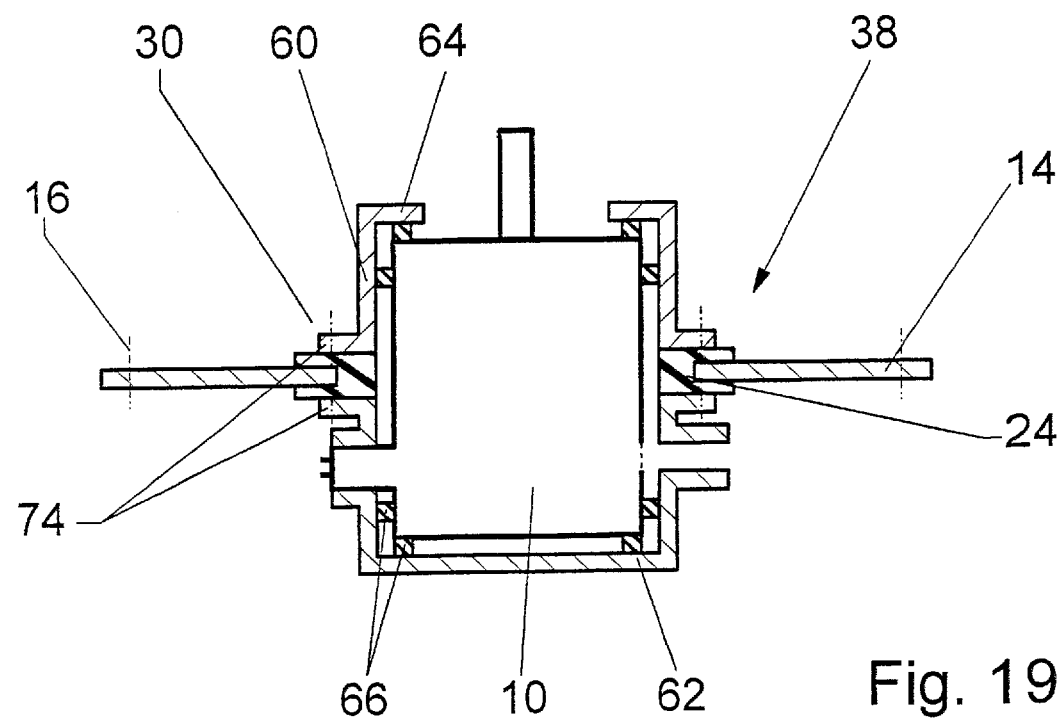
Figure 20:
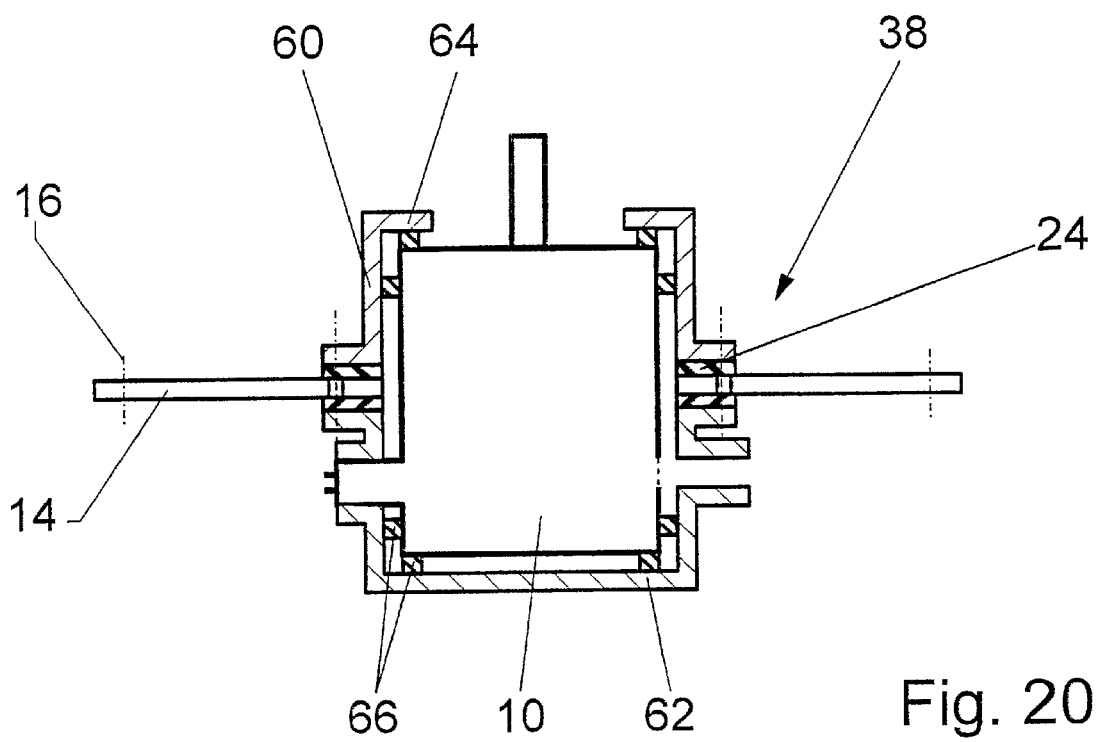

In the version of FIG. 18, damping elements 70 and 72 are sprayed onto the face end, toward the parting seam, of the housing pot parts 60 and 62 and abut one another on the face end in the installed state, while toward the outside the annular damping element 24 adjoins them.

The housing pot parts 60 and 62 in the versions of FIGS. 19–22 have edges 74 toward the parting seam, between which edges the annular damping element 24 is disposed and fastened by fastening means, not shown in detail. While in the version of FIG. 19 the annular damping element 24 is in one piece, the damping element 24 in the versions of FIGS. 20–22 comprises two pieces, which are disposed on both sides of the fastening flange 14 and are secured in a suitable way selectively to the fastening flange 14 or to the edges 74 of the housing pots 60 and 62.

Figure 21:
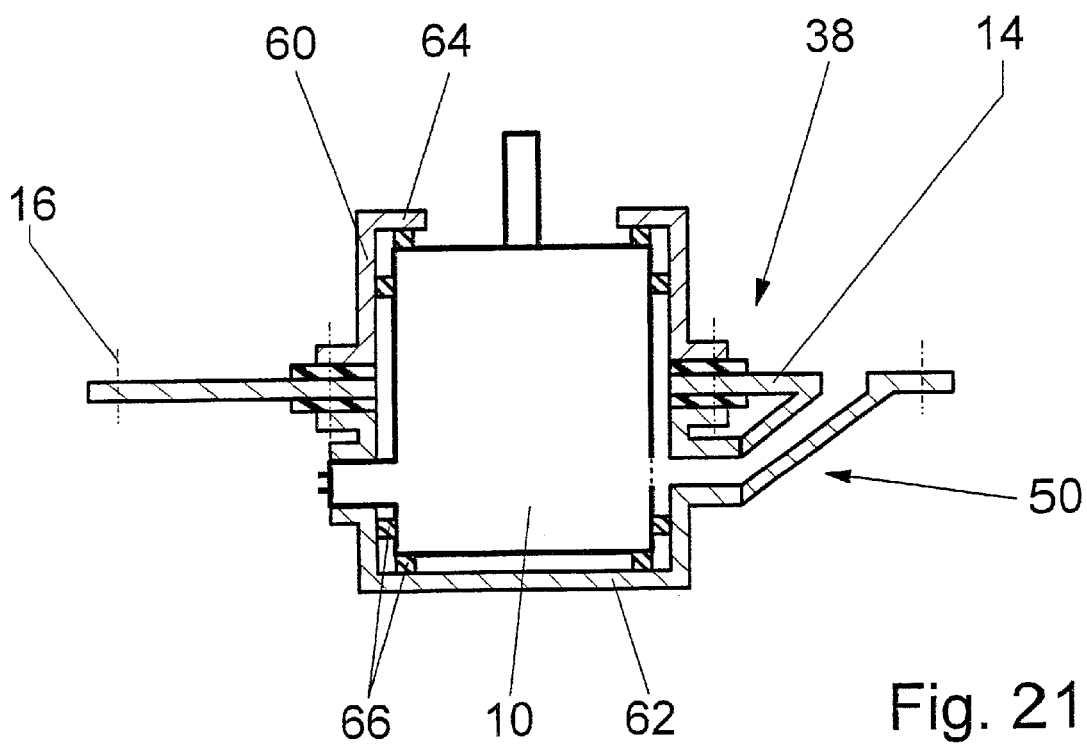
Figure 22:
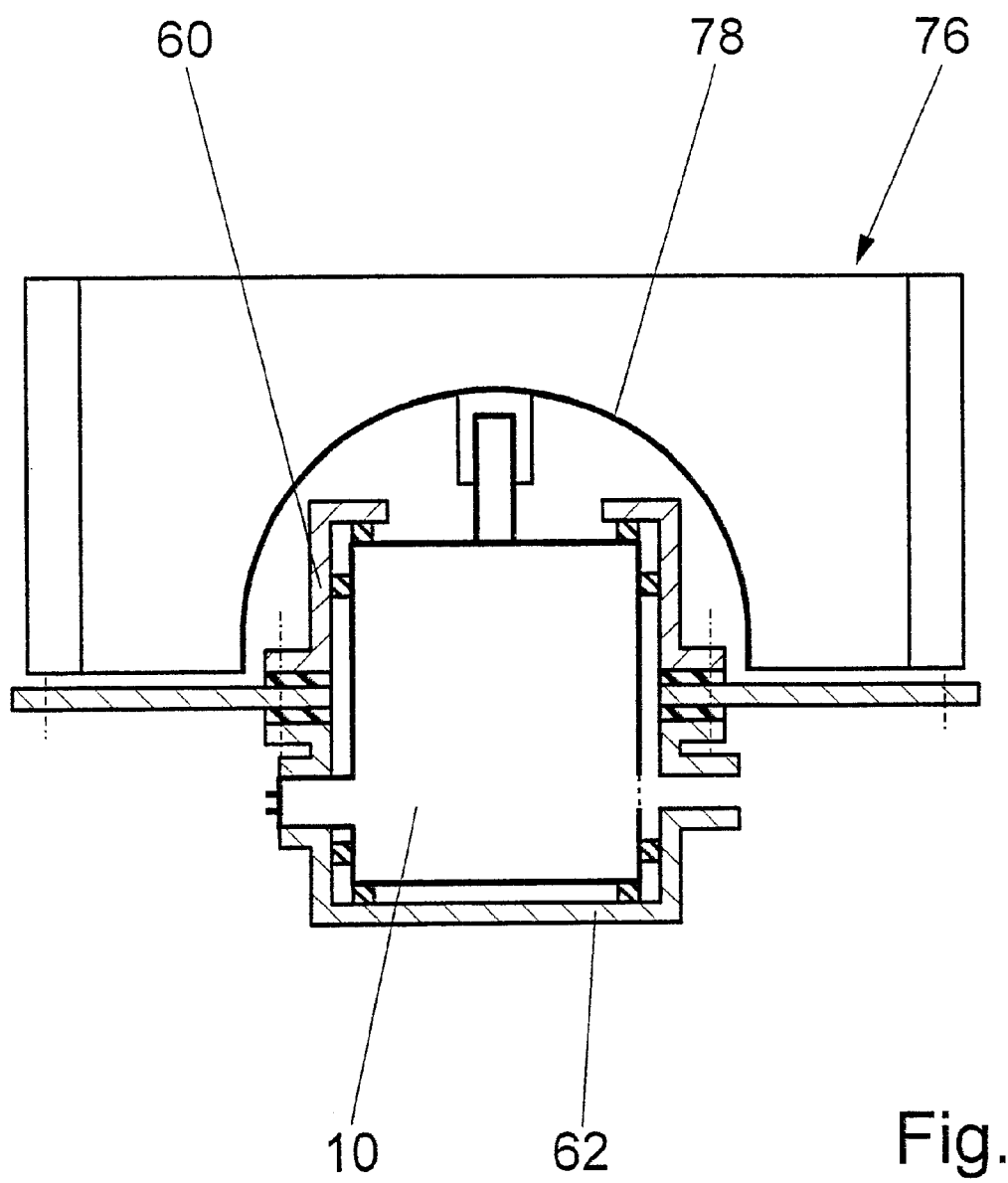

The version of FIG. 21 has as its special feature a ventilation conduit 50 that is integrated with the fastening flange 14.

LIST OF REFERENCE NUMERALS

10 Blower motor
12 Housing pot
14 Fastening flange
16 Fastening region
18 Spacing
20 Inner part
22 Outer part
24 Damping element
26 Part
28 Part
30 Fastening points
32 Gravity
34 Arrow
36 Arrow
38 Transitional region
40 Collar
42 Damping element
44 Collet
46 Cap
48 Receptacle
50 Ventilation conduit
52 Damping element
54 Damping element
56 Damping element
58 Parting plane
60 Housing pot part
62 Housing pot part
64 Collet
66 Damping element 68 Electrical terminal
70 Damping element
72 Damping element
74 Edge
76 Fan wheel
78 Fan hub
80 Rotational travel
82 Shoe
84 Rivet
86 Disk
88 Damping element
90 Damping element
92 Protrusion
94 Oblong slot
96 Protrusion
98 Layer

What is claimed is:

1. A blower motor (10), which is accommodated in a housing pot (12) with a fastening flange (14), wherein damping elements are disposed between the blower motor (10) and a fastening region (16), characterized in that at least one annular damping element (24, 54, 56, 90) is disposed between the housing pot (12) and a fastening region (16) of the fastening flange (14), wherein the fastening flange (14) comprises an inner part (20) and an outer part (22), which are joined together via the damping element (24).

2. The blower motor (10) of claim 1, wherein the damping element (24) comprises materials having different physical properties.

3. The blower motor (10) of claim 1, wherein the housing pot (12) has a travel limitation in the circumferential direction and/or in the radial and/or axial direction relative to the fastening region (16).

4. The blower motor (10) of claim 1, wherein the inner part (20) and the outer part (22) partly overlap, and in that region, the annular damping element (24) is sprayed on, vulcanized on, or glued on.

5. The blower motor (10) of claim 1, wherein the inner part (20) and the outer part (22) are located in the same plane, and one part (20, 22), at the connecting point, grips the damping element (24) with an annular shoe (82), while the other part (20, 22) is embedded via the open side in a damping element (24).

6. The blower motor (10) of claim 1, wherein the outer part (22) overlaps the inner part (20), and between the two parts (20, 22) at least one annular damping element (24) is disposed, which is braced between the two parts (20, 22) via fastening elements (84, 86), which are decoupled from the parts (20, 22) by further damping elements (88).

7. The blower motor (10) of claim 1, wherein a horizontal installation of the blower motor (10), the annular damping element (24) is disposed such that it is under pressure (34, 36).

8. The blower motor (10) of claim 7, wherein the fastening flange (14) has a formed-on receptacle (48) for the annular damping element (24), on which an axial protrusion (96), to which a cap (46) having a further annular damping element (42) is clipped to the face end of the housing pot (12).

9. The blower motor (10) of claim 1, wherein the damping element (24) is produced by the two-component injection molding process.

10. The blower motor (10) of claim 1, wherein the damping element (54, 56) is embodied as an elastically yielding region on the fastening flange (14).

11. The blower motor (10) of claims, wherein the damping elements (54, 56) act in the circumferential direction and/or in the radial direction and/or axial direction.

12. The blower motor (10) of claim 1, wherein the fastening flange (14) is at least partly coated with damping material on one or both face ends.

13. A blower motor (10), which is accommodated in a housing pot (12) with a fastening flange (14), wherein damping elements are disposed between the blower motor (10) and a fastening region (16), characterized in that at least one annular damping element (24, 54, 56, 90) is disposed between the housing pot (12) and a fastening region (16) of the fastening flange (14), wherein the damping element (24, 90) is disposed in the transitional region (38) between the housing part (12) and the fastening flange (14), and wherein the fastening flange (10), on its side toward the housing pot (12), has a collar (40), which surrounds an annular damping element (24) that contacts the outer diameter of the housing pot (12).

14. The blower motor (10) of claim 13, wherein a horizontal installation of the blower motor (10), the annular dampling element (24) is disposed such that it is under pressure (34, 36).

15. The blower motor (10) of claim 13, wherein a ventilation conduit (50) is provided on the fastening flange (14) and is decoupled from the housing pot (12) by an annular damping element (52).

16. A blower motor (10), which is accommodated in a housing pot (12) with a fastening flange (14), wherein damping elements are disposed between the blower motor (10) and a fastening region (16), characterized in that at least one annular damping element (24, 54, 56, 90) is disposed between the housing pot (12) and a fastening region (16) of the fastening flange (14), wherein the housing pot (12) has a horizontal or vertical parting plane (58), and the two housing pot parts (60, 62) are joined by means of clips, glue, screws or rivets, and on them, with the interposition of at least one annular damping element (24), the fastening flange (14) is mounted.

17. The blower motor (10) of claim 16, wherein the blower motor (10) is supported rigidly in the horizontal and/or the vertical direction in the housing pot (12) with the interposition of damping and sealing elements (66).

18. The blower motor (10) of claim 16, wherein electrical terminals (68) or system-specific ventilation conduits (50) are assigned to one housing pot part (62).

19. The blower motor (10) of claim 16, wherein in the region of the parting plane (58), the housing pot parts (60, 62) have sprayed-on damping elements (70, 72), which are materially joined to the annular damping element (24) that is sprayed on the fastening flange (14).

20. The blower motor (10) of claim 16, wherein in the region of the parting plane (58), the housing pot parts (60, 62) have formed-on edges (74), which are screwed or riveted to one another and between which the fastening flange (14) is disposed with the interposition of at least one annular damping element (24).

21. The blower motor (10) of claim 20, wherein the damping element (24) is part of the fastening flange (14) and/or of the housing pot parts (60, 62).

22. The blower motor (10) of claim 16, wherein the ventilation conduit (50) is part of the fastening flange (14).

* * * * *